(12) United States Patent
Browne

(10) Patent No.: US 8,997,395 B2
(45) Date of Patent: Apr. 7, 2015

(54) FISHING POLE HOLDER MOUNT

(76) Inventor: Scott Browne, Marion, MI (US)

( * ) Notice: Subject to any disclaimer, the term of this patent is extended or adjusted under 35 U.S.C. 154(b) by 389 days.

(21) Appl. No.: 13/537,124

(22) Filed: Jun. 29, 2012

(65) Prior Publication Data

US 2013/0008074 A1    Jan. 10, 2013

Related U.S. Application Data

(60) Provisional application No. 61/504,350, filed on Jul. 5, 2011.

(51) Int. Cl.
*A01K 97/10*    (2006.01)

(52) U.S. Cl.
CPC ..................................... *A01K 97/10* (2013.01)

(58) Field of Classification Search
USPC .................... 43/21.2; 248/512, 513
See application file for complete search history.

(56) References Cited

U.S. PATENT DOCUMENTS

| | | | |
|---|---|---|---|
| 1,719,695 A * | 7/1929 | Ferguson ..................... 248/515 |
| 2,607,398 A | 8/1952 | Andrews | |
| D179,525 S | 1/1957 | Porter | |
| 4,485,579 A * | 12/1984 | Hawie ............................ 43/21.2 |
| 4,650,146 A * | 3/1987 | Duke ............................ 248/512 |
| 4,823,723 A * | 4/1989 | Brooks ......................... 114/343 |
| 5,058,308 A | 10/1991 | Girard | |
| 5,383,299 A | 1/1995 | Smelker | |
| 5,438,789 A * | 8/1995 | Emory ............................ 43/21.2 |
| D393,690 S | 4/1998 | Lovelady et al. | |
| 5,778,592 A * | 7/1998 | Malmberg ...................... 43/21.2 |
| 5,979,102 A * | 11/1999 | Sagryn ........................... 43/21.2 |
| 5,987,803 A * | 11/1999 | White ............................. 43/21.2 |
| 6,289,627 B1 * | 9/2001 | Gibbs et al. .................... 43/21.2 |
| 6,490,823 B1 * | 12/2002 | Ibarra ............................. 43/21.2 |
| 7,296,377 B2 * | 11/2007 | Wilcox et al. .................. 43/21.2 |
| 7,331,139 B2 | 2/2008 | Moses | |
| 7,650,713 B1 * | 1/2010 | Peede ............................. 43/21.2 |
| 7,937,883 B2 * | 5/2011 | Roemer et al. ................. 43/21.2 |
| 2005/0102881 A1 * | 5/2005 | Legendziewicz ............. 43/21.2 |

FOREIGN PATENT DOCUMENTS

FR    2639183 A1 *    5/1990

* cited by examiner

*Primary Examiner* — Christopher P Ellis
(74) *Attorney, Agent, or Firm* — Buckingham Doolittle & Burroughs, LLC

(57) ABSTRACT

A fishing pole holder mount for mounting to a watercraft or other structure that is capable of holding more than one fishing pole at the same time, wherein the fishing pole holders are horizontally and vertically repositionable relative to one another and the base of the fishing pole holder mount. The fishing pole holder mount of the present invention also allows a user to specify the number of fishing pole holders removably attached thereto.

18 Claims, 5 Drawing Sheets

FISHING POLE HOLDER MOUNT

CROSS-REFERENCE

This application claims priority from Provisional Patent Application Ser. No. 61/504,350 filed on Jul. 5, 2011.

FIELD OF THE INVENTION

This invention relates to a mounting device for holding multiple fishing poles in a removably secured and repositionable manner.

BACKGROUND

Oftentimes, fisherman desire to use more than one fishing pole or rod at the same time. Using more than one fishing pole at a time increases the fisherman's likelihood of catching fish and having a successful outing. However, holding and/or operating multiple fishing poles at the same time can be a challenging task for even the most accomplished or experienced fisherman.

Fishing pole holders are known in the art and are useful for holding and/or permitting a fisherman to operate more than one fishing pole at the same time. Most known fishing pole holders hold a single pole and are either inserted into the ground or attached to a pier, a boat or other watercraft. However, the use of single fishing pole holders require a fisherman to purchase multiple fishing pole holders (i.e., one for each fishing pole), which can be expensive and take up a lot of space on a pier, a boat or other watercraft, where space is typically limited. The use of single pole holders, which are oftentimes spread out in a boat to avoid the tangling of various fishing lines, also make it difficult for the fisherman to readily access any one of his or her fishing poles should the need arise (e.g., if the fisherman catches a fish).

Other fishing pole holders known in the art, such as that which is disclosed in U.S. Pat. No. 5,383,299 to Smelker, are capable of holding two fishing poles in a side by side, fixed position and are inserted into the ground. However, these fishing pole holders are not repositionable relative to one another and the surface to which they are mounted. These prior art fishing pole holders are also not capable of supporting a user specified number of additional fishing poles.

Consequently, there exists in the art a long-felt need for a fishing pole holder mount that is capable of holding more than one fishing pole at the same time, wherein the fishing pole holders are horizontally and vertically repositionable relative to one another and the surface to which they are mounted. There also exists in the art a long felt need for a fishing pole holder mount that enables a user to specify the number of fishing pole holders attached thereto. Finally, there is a long-felt need for a fishing pole holder mount that accomplishes all of the forgoing objectives and that is relatively inexpensive to manufacture, and easy to use.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, is a fishing pole holder mount comprised of a base, a support attached to and extending outwardly from said base, and more than one fishing pole holder attached to and repositionable about said support, wherein the user can specify the number of fishing pole holders attached to the support. More specifically, the fishing pole holders are stacked along said support such that the various fishing pole holders employed along said support are at differing elevations relative to the base.

The fishing pole holder mount of the present invention enables a user to easily and securely employ and manage a user specified number of fishing poles at the same time. The fishing pole holder mount also enables a user to horizontally and vertically reposition the various fishing pole holders relative to one another and the base. Finally, the fishing pole holder mount of the present invention is relatively inexpensive to manufacture, and easy to use.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
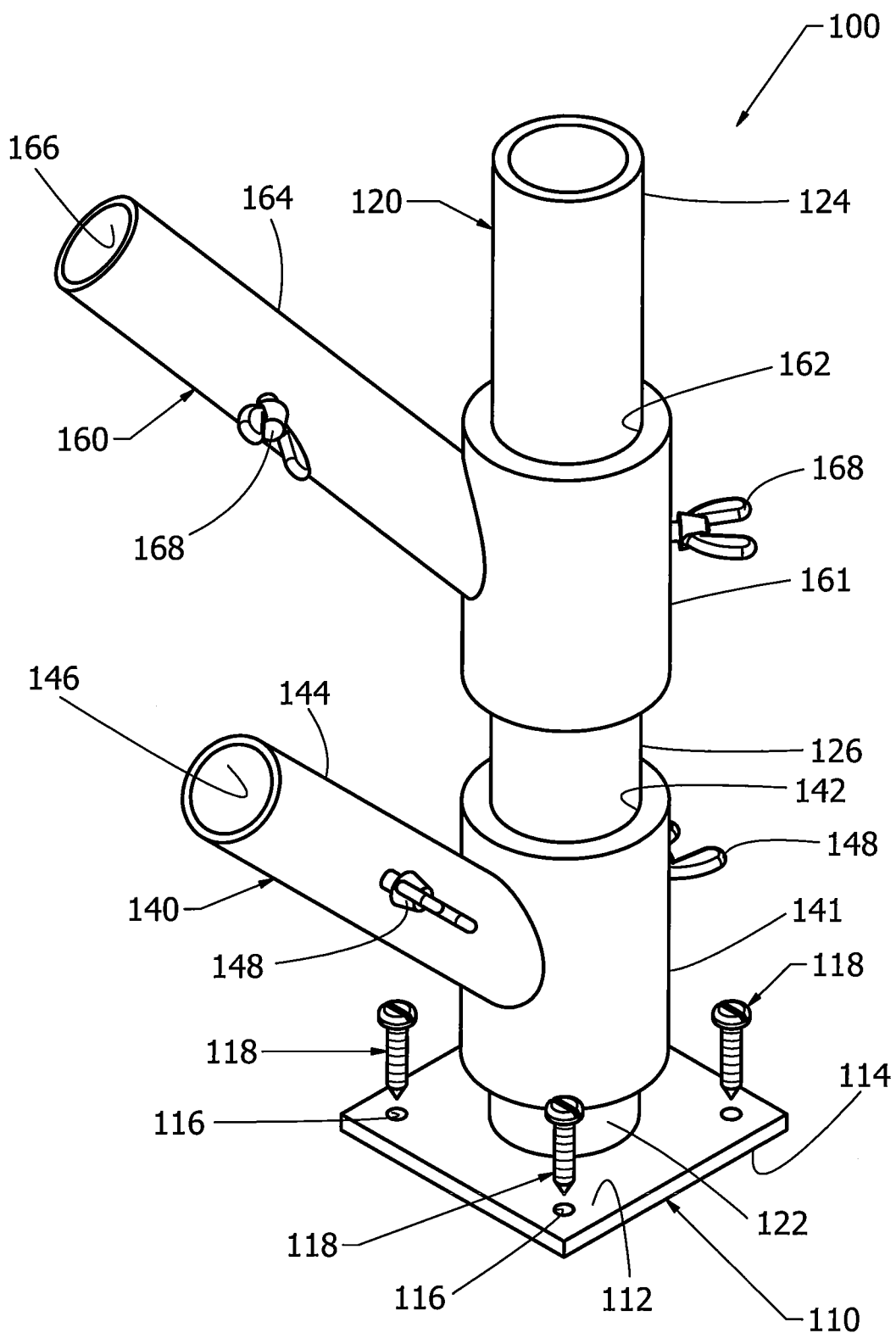
FIG. 1 illustrates a perspective view of one embodiment of the fishing pole holder mount of the present invention with two fishing pole holders removably attached thereto.
Figure 2:
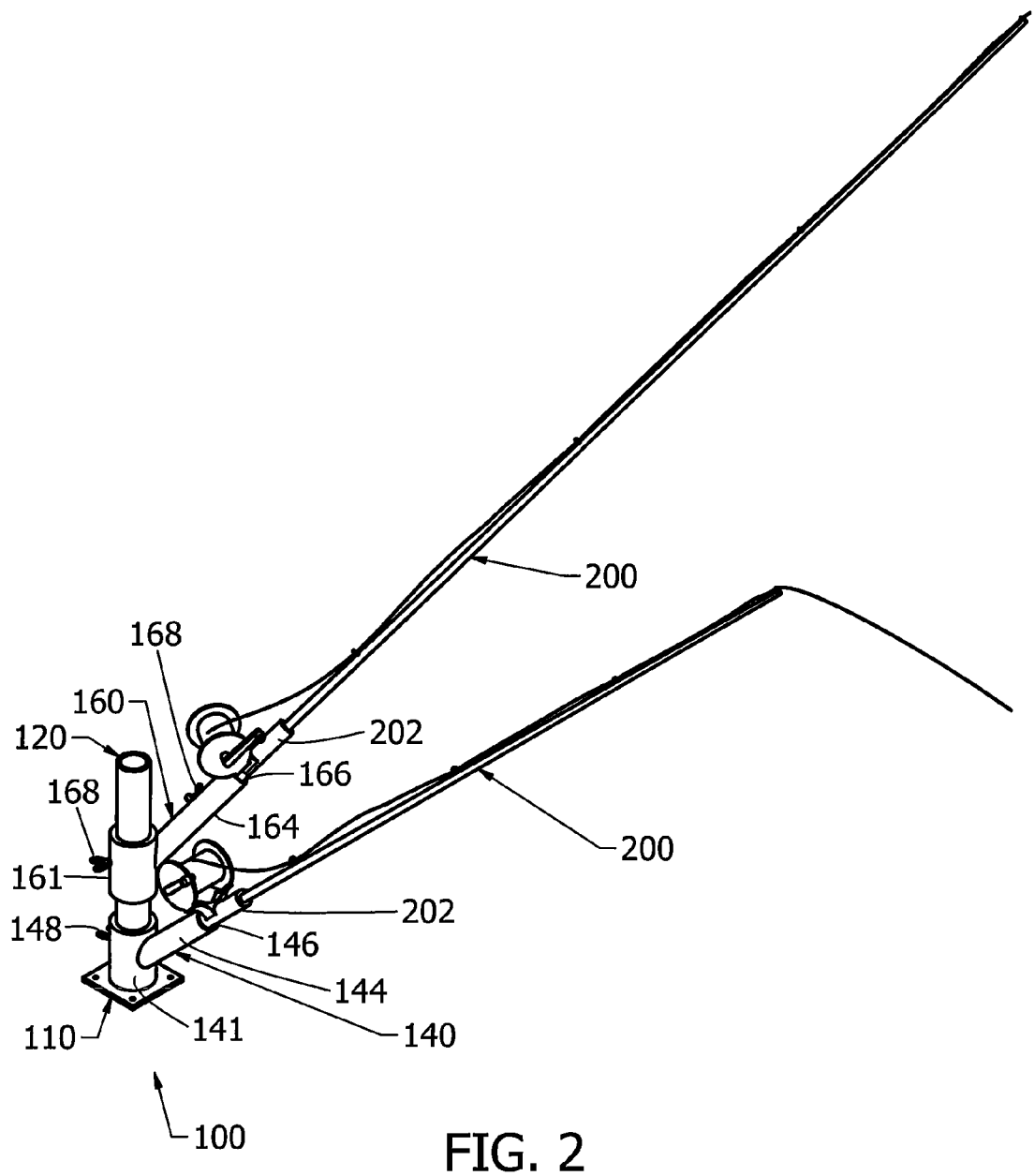
FIG. 2 illustrates a perspective view of the fishing pole holder mount depicted in FIG. 1 with fishing poles installed thereon.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details.

The fishing pole holder mount of the present invention enables a user to easily and securely employ and manage a user specified number of fishing poles at the same time. The fishing pole holder mount also enables a user to horizontally and vertically reposition the various fishing pole holders relative to one another and the base. Finally, the fishing pole holder mount of the present invention is relatively inexpensive to manufacture and easy to use.

Referring initially to the drawings, FIG. 1 illustrates a perspective view of one embodiment of the fishing pole holder mount 100 of the present invention, which comprises a base 110, a support 120, a first fishing pole holder 140 and a second fishing pole holder 160. Unless otherwise stated herein, the various components of fishing pole holder mount 100 are preferably constructed of a metal, such as steel, iron or aluminum, though it is contemplated that base 110 can also be constructed of other durable materials, such as wood, plastic and the like, without affecting the overall concept of the present invention.

Base 110 is preferably a plate-like structure that can be used to attach fishing pole holder mount 100 to a relatively flat surface such as the ground, a watercraft (e.g. a boat), a deck, railing or the like. More specifically, base 110 is preferably comprised of a top surface 112, a bottom surface 114 and a plurality of spaced apart openings 116 extending through said base 110 for receipt of fasteners 118 for attaching the base to an object or surface. Fasteners 118 can be any fastener commonly known in the art for securing a structure to a surface, including nails, screws, rivets and the like. For a more permanent solution, it is also contemplated that base 110 can be glued or welded to the desired object or surface.

While the materials used and the dimensions of base 110 can vary to suit user preference and the particular application, a base 110 comprised of aluminum and measuring approximately 4 inches in length by 4 inches in width with an approximate thickness of ¼ inch is suitable for most applications and environments. Notwithstanding any of the forgoing, its is also contemplated that base 110 can be in the form of a prior art clamp or band, as opposed to a plate, provided that base 110 can function to securely attach support 120 to a desired surface.

As illustrated in FIG. 1, support 120 is preferably an elongated member, such as a length of pipe, comprised of a first end 122, a second end 124 and an outer surface 126. First end 122 of support 120 can be attached to the top surface 112 of base 110 by any common means known in the art such as welding, glue, etc., and extends outwardly from base 110 as shown in the FIGS. Nonetheless, it is also contemplated that support 120 could be fixedly or removably attached to base 110 by other means commonly known in the art including, without limitation, fasteners, clamps, press-fit, threading, etc.

Support 120 is preferably cylindrical in shape and between 12 and 20 inches in length, measured from first end 122 to second end 124, with an outside diameter of between ¾ and 2 inches. However, it is also contemplated that other shapes and dimensions can be used to suit user preference. The outer surface 126 of support 120 can be relatively smooth or threaded (not shown) to mate with the interior surface of a fishing pole holder in a male-female relationship, as further described below.

As depicted in the FIG. 1, first fishing pole holder 140 is preferably a generally y-shaped section of pipe comprised of a relatively straight body portion 141 with a continuous opening 142 formed therein for receipt of support 120, and a holder portion 144 with an opening 146 formed therein for receipt of a handle 202 of a fishing pole 200. The interior surface of continuous opening 142 can be relatively smooth or threaded (not shown) for removable attachment to a support 120 with a corresponding relatively smooth or threaded outer surface 126. The length of straight body portion 141 is preferably between 3 and 7 inches and the inside diameter of continuous opening 142 should be sized to correspond to the outside diameter of support 120 so that first fishing pole holder 140 can be placed or threaded over support 120, as best illustrated in FIGS. 1-4.

The length of holder portion 144, measured from body portion 141 to the end of holder portion 144 is preferably between 9 and 10 inches, though it is contemplated that other dimensions could also be used within the scope of the present invention. The inside diameter of holder opening 146 should be approximately between 1 and 3 inches to receive most sizes of fishing pole handles 202, though other diameter sizes are also contemplated. The angle of holder portion 144 relative to body portion 141 is preferably between 30 and 45 degrees, though it is contemplated that other angles could also be used. In a preferred embodiment of the present invention, body portion 141 may further comprise a fastening means 148, such as a set screw, winged screw (as shown in the FIGS.) or other fastener, for securing first fishing pole holder 140 in a desired position along support 120, as described more fully below. Similarly, an additional fastening means 148 could also be included along holder portion 144 to secure fishing pole handle 202 within holder opening 146 of first fishing pole holder 140.

Figure 3:
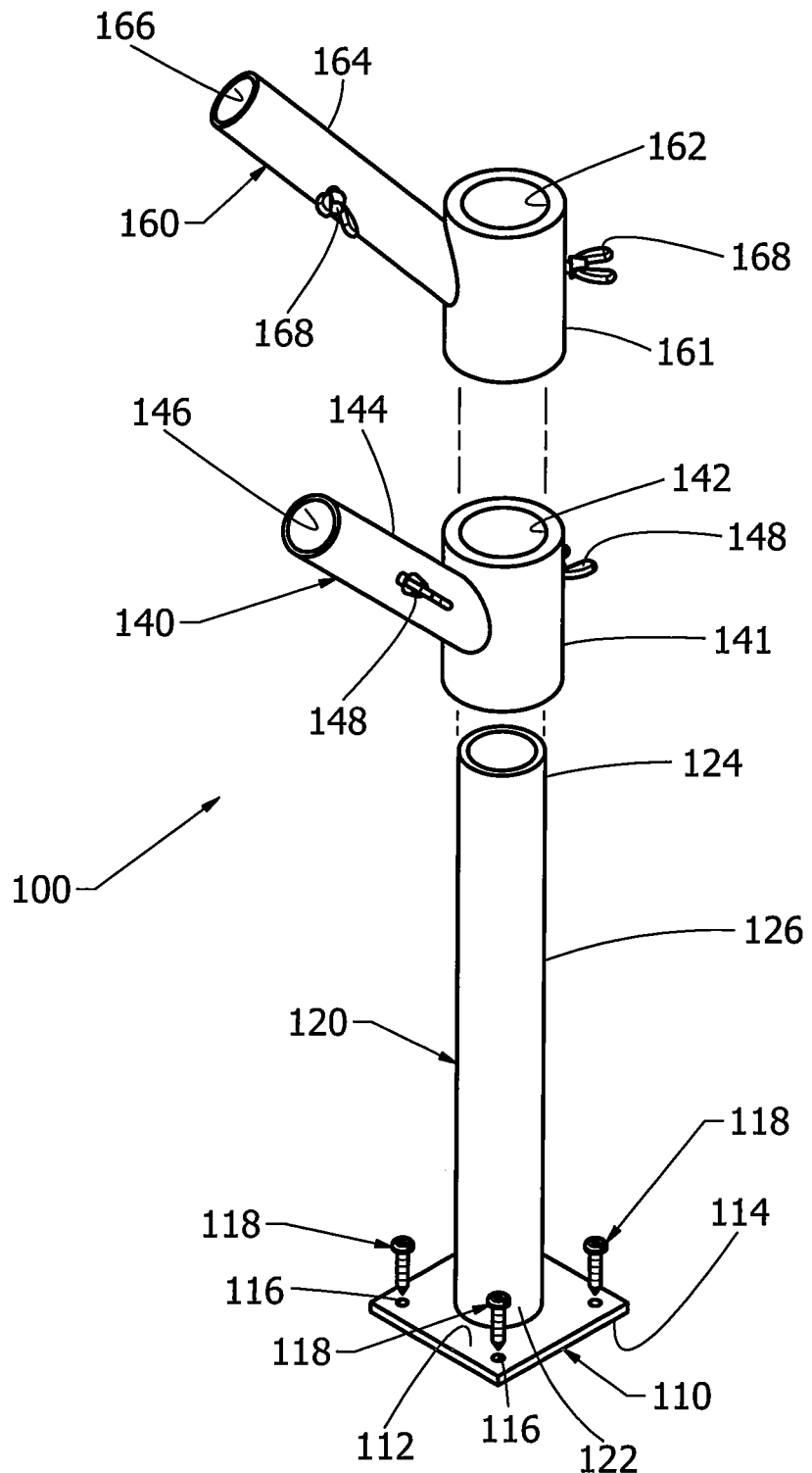
FIG. 3 illustrates a perspective view of the fishing pole holder mount depicted in FIG. 1 as the first and second fishing pole holders are being installed thereon.

Second fishing pole holder 160 is also preferably a generally y-shaped section of pipe comprised of a relatively straight body portion 161 with a continuous opening 162 formed therein for receipt of support 120, and a holder portion 164 with an opening 166 formed therein for receipt of a handle 202 of a fishing pole 200. The interior surface of continuous opening 162 can be relatively smooth or threaded (not shown) for removable attachment to a support 120 with a corresponding relatively smooth or threaded outer surface 126. The length of straight body portion 161 is preferably between 3 and 7 inches and the inside diameter of continuous opening 162 should be sized to correspond to the outside diameter of support 120 so that second fishing pole holder 160 can be placed or threaded over support 120, as best illustrated in FIG. 3 and explained more fully below.

The length of holder portion 164, measured from body portion 161 to the end of holder portion 164 is preferably between 9 and 10 inches, though it is contemplated that other dimensions could also be used within the scope of the present invention. The inside diameter of holder opening 166 should be approximately between 1 and 2 inches to receive most sizes of fishing pole handles 202, though other diameter sizes are also contemplated. The angle of holder portion 164 relative to body portion 161 is preferably between 30 and 45 degrees, though it is contemplated that other angles could also be used. In a preferred embodiment of the present invention, body portion 161 may further comprise a fastening means 168, such as a set screw, winged screw (as shown in the FIGS.) or other fastener, for securing second fishing pole holder 160 in a desired position along support 120 above first fishing pole holder 140, as described more fully below. Similarly, an additional fastening means 168 could also be included along holder portion 164 to secure fishing pole handle 202 within holder opening 166 of second fishing pole holder 160.

Figure 4:
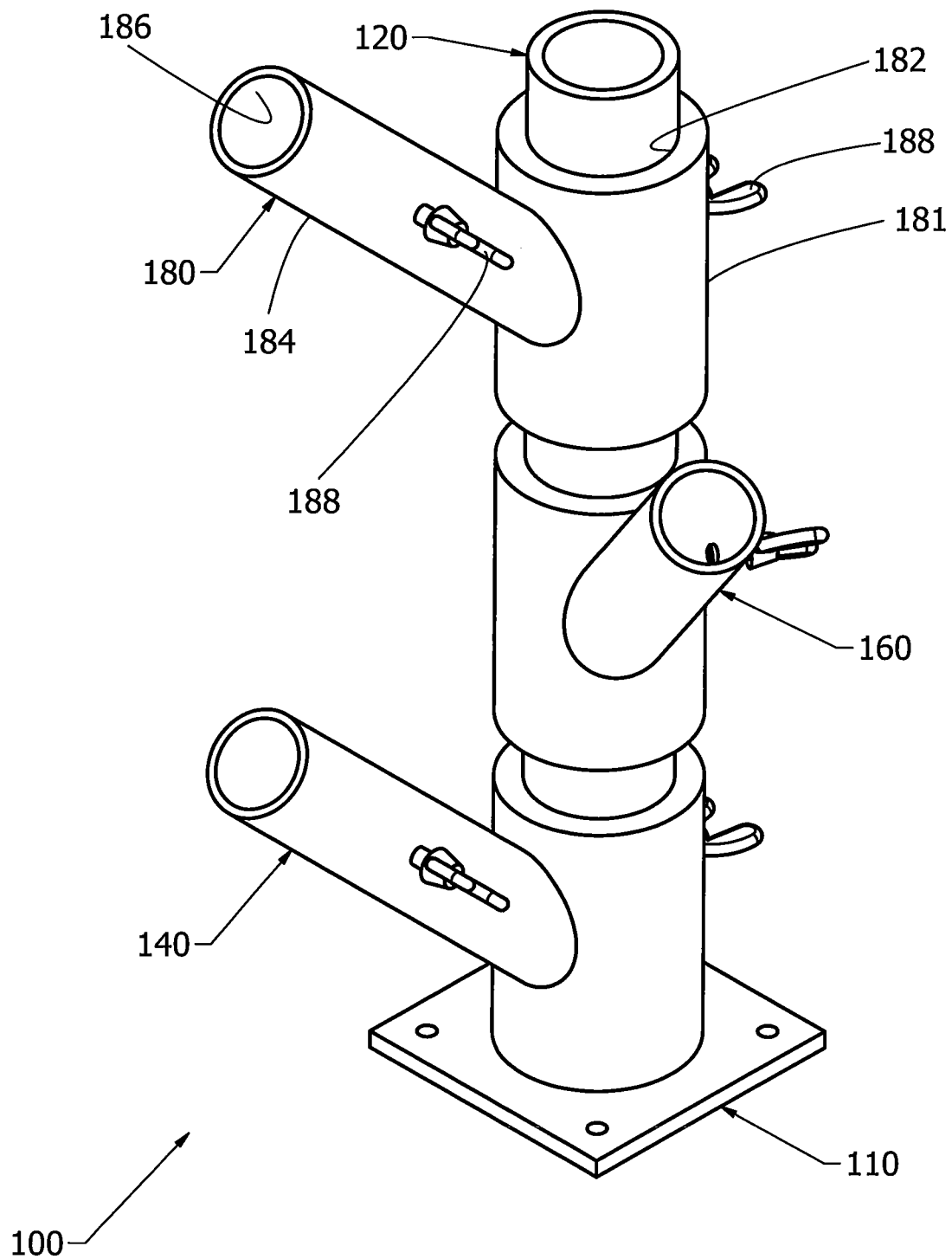
FIG. 4 illustrates a perspective view of another embodiment of the fishing pole holder mount of the present invention which employs three fishing pole holders.

As depicted in the FIG. 4, fishing pole holder mount 100 can be further comprised of additional first fishing pole holders 180 to suit user preference. Each of additional fishing pole holders 180 is preferably a generally y-shaped section of pipe comprised of a relatively straight body portion 181 with a continuous opening 182 formed therein for receipt of support 120, and a holder portion 184 with an opening 186 formed therein for receipt of a handle 202 of a fishing pole 200. The interior surface of continuous opening 182 can be relatively smooth or threaded (not shown) for removable attachment to a support 120 with a corresponding relatively smooth or threaded outer surface 126. The length of straight body portion 181 is preferably between 3 and 7 inches and the inside diameter of continuous opening 182 should be sized to correspond to the outside diameter of support 120 so that the additional fishing pole holder(s) 180 can be placed or threaded over support 120 above first fishing pole holder 140 and second fishing pole holder 160, as best illustrated in FIG. 4.

The length of holder portion 184, measured from body portion 181 to the end of holder portion 184 is preferably between 9 and 10 inches, though it is contemplated that other dimensions could also be used within the scope of the present invention. The inside diameter of holder opening 186 should be approximately between 1 and 2 inches to receive most sizes of fishing pole handles 202, though other diameter sizes are also contemplated. The angle of holder portion 184 relative to body portion 181 is preferably between 30 and 45 degrees, though it is contemplated that other angles could also be used. In a preferred embodiment of the present invention, body portion 181 may further comprise a fastening means 188, such as a set screw, winged screw (as shown in FIG. 4) or other fastener, for securing the additional fishing pole holder 180 in a desired position along support 120, as described more fully below. Similarly, an additional fastening means 188 could also be included along holder portion 184 to secure fishing pole handle 202 within holder opening 186 of additional fishing pole holder 180.

Figure 5:
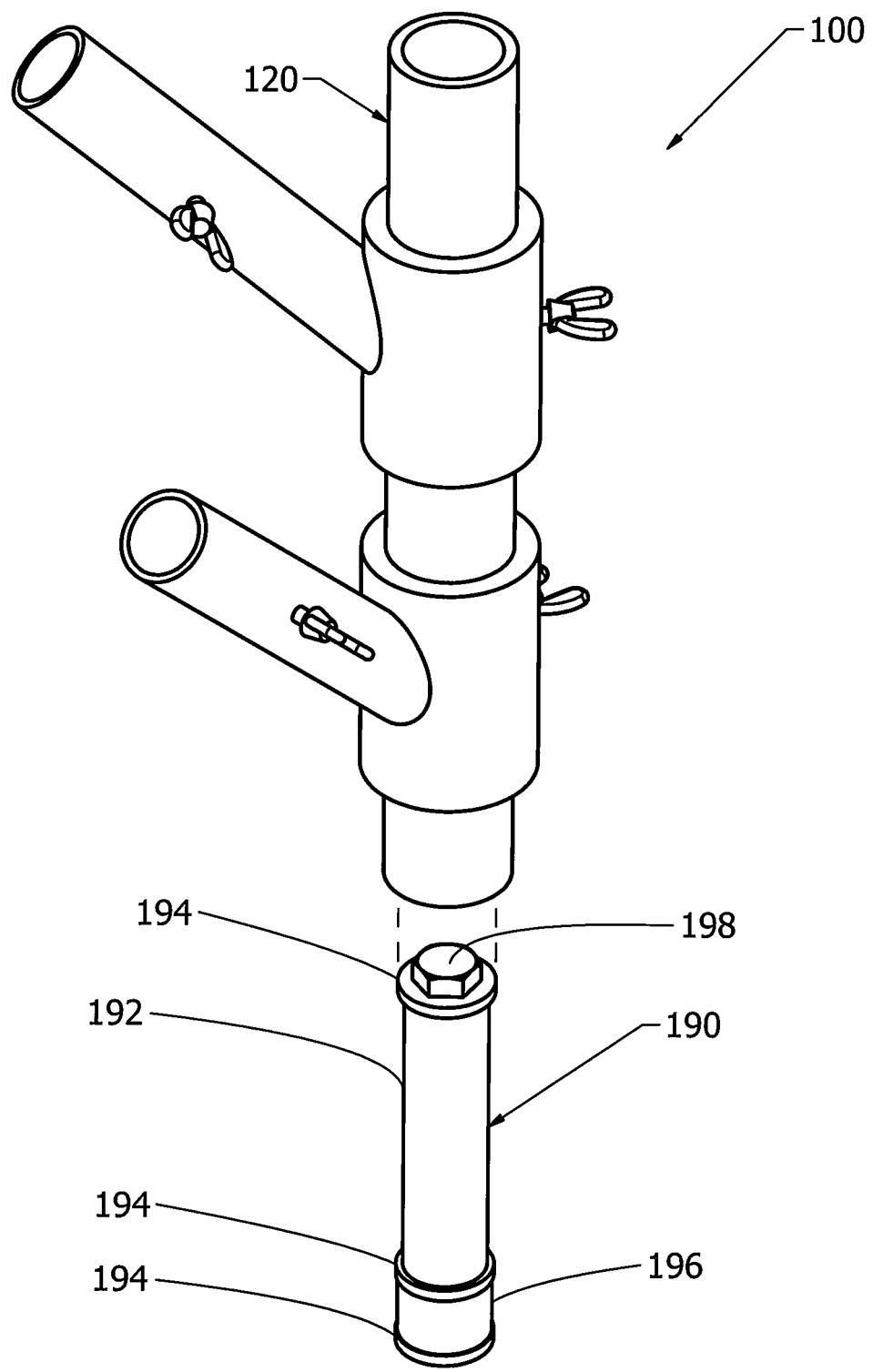
FIG. 5 illustrates a perspective view of another embodiment of the fishing pole holder mount of the present invention which is capable of being used in conjunction with an existing fishing pole holder.

FIG. 5 illustrates yet another potential embodiment of the device of the present invention, and further includes a converter device 190 that can be used to attach fishing pole holder mount 100, less base 110, to an existing prior art fishing pole holder (not shown), thereby allowing the user to easily and quickly convert an existing single fishing pole holder into a multi-fishing pole holder. More specifically, converter device 190 can be securely and removably attached to an existing fishing pole holder by inserting the same into an opening in an existing fishing pole holder (not shown) similar to the way that a fishing pole handle would be inserted into the holder. Once inserted, support 120 can be placed over top of converter device 190 as shown in FIG. 5.

Converter device 190 preferably comprises a body portion 192, a plurality of washers 194, a compression portion 196 and a tightening means 198, such as a threaded bolt. Each of bolt 198, body portion 192 and washers 194 are preferably comprised of a durable materials such as a metal, plastic, etc., and compression portion 196 is preferably comprised of a compressible material such as rubber, though other materials could also be used.

Each of body portion 192, washers 194, and compression portion 196 have a continuous opening therein (not shown) for receipt of bolt 198, and the continuous opening in the outermost washer 194 that is adjacent to compression portion is preferably threaded to match the thread pattern of bolt 198. In this manner, as bolt 198 is threaded into said outermost washer 194 said outermost washer 194 is drawn closer to the head of bolt 198 which, in turn will cause compression portion 196 to compress and its outside diameter to expand against the interior portion of the existing fishing pole holder.

Having now described the preferred and alternative embodiments of fishing pole holder mount 100, the use and usefulness of the preferred embodiment will now be described. A user (not shown) desiring to use the mount 100 would first use fasteners 118 to removably attach base 110 to a desired structure (e.g., a watercraft, a deck, railing, the ground, etc.). Once attached, the user would install the desired number of fishing pole holders along support 120. For example, a user desiring to use mount 100 in conjunction with three fishing poles 200 would install first fishing pole holder 140, second fishing pole holder 160 and third fishing pole holder 180 on support 120 in stacked relationship as shown in FIG. 4. If the outer surface 126 of support 120 is relatively smooth, the user would simply insert the second end 124 of support 120 through opening 142 of first fishing pole holder 140 and slide first fishing pole holder 140 along support 120 into the desired position above base 110. It should also be appreciated that holder portion 144 can be rotated about support 120 so that the user can also select the direction in which his or her fishing pole 200 will extend from support 120. Once the desired position and direction are achieved, the user can use the fastening means 148 to removably secure first fishing pole holder 140 to the support 120. Once secured, the user can insert fishing pole handle 202 into holder opening 146 and use the fastening means 148 located along holder portion 144 to secure the fishing pole 200 to the first fishing pole holder 140. Second fishing pole holder 160 and additional fishing pole holder(s) 180 can be attached to support 120 in the same manner and in a stacked fashion as depicted in FIG. 4. It should be appreciated that each of fishing pole holders 140, 160 and 180 can be positioned to extend outwardly from support 120 in different directions, as best illustrated in FIG. 4.

By comparison, if the outer surface 126 of support 120 and the inner surfaces of body portions 141, 161, 181 are threaded, the user would simply thread each of fishing pole holders 140, 160 and 180 onto support 120 in stacked relationship. Similar to the unthreaded embodiment of the present invention, it should be appreciated that each of fishing pole holders 140, 160 and 180 can be positioned to extend outwardly from support 120 in different directions, as best illustrated in FIG. 4.

Additionally, other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fishing pole holder mount comprising:
   a base;
   a first fishing pole holder attached to said base, wherein said first fishing pole holder is generally y-shaped and comprised of a body portion, a holder portion with an opening therein and a fastening means for adjusting the size of said opening; and
   a second fishing pole holder attached to said base, wherein a portion of said second fishing pole holder is positioned above said first fishing pole holder.

2. The fishing pole holder mount of claim 1 wherein said fishing pole holder mount further comprises at least one additional fishing pole holder.

3. The fishing pole holder mount of claim 1 wherein said base is mounted to a watercraft.

4. The fishing pole holder mount of claim 1 wherein said first fishing pole holder is repositionable relative to said second fishing pole holder.

5. The fishing pole holder mount of claim 1 wherein each of said first fishing pole holder and said second fishing pole holder further comprise an opening therein for receipt of a fishing pole.

6. The fishing pole holder mount of claim 1 further comprising a user specified number of additional fishing pole holders attached to said base.

7. The fishing pole holder mount of claim 1 wherein at least one of said first fishing pole holder and said second fishing pole holder is comprised of aluminum.

8. A fishing pole holder mount comprising:
   a base;
   a support;
   a first fishing pole holder attached to and repositionable about said support; and
   a second fishing pole holder attached to and repositionable about said support, wherein a portion of said second fishing pole holder is positioned above said first fishing pole holder and further wherein said second fishing pole holder is generally y-shaped and comprised of a body portion, a holder portion with an opening therein and a set screw for adjusting the size of said opening.

9. The fishing pole holder mount of claim 8 wherein said first fishing pole holder is rotationally and vertically repositionable along said support.

10. The fishing pole holder mount of claim 8 wherein said base is mounted to a watercraft.

11. The fishing pole holder mount of claim 8 further comprising a user specified number of additional fishing pole holders attached to and repositionable about said support.

12. The fishing pole holder mount of claim 8 wherein each of said first fishing pole holder and said second fishing pole holder further comprise an opening therein for receipt of a fishing pole.

13. The fishing pole holder mount of claim 8 wherein at least one of said first fishing pole holder and said second fishing pole holder is comprised of aluminum.

14. The fishing pole holder mount of claim 11 wherein at least one of said user specified number of additional fishing pole holders is positioned above both the first fishing pole holder and the second fishing pole holder relative to the base.

15. A fishing pole holder mount comprising:
   a base;
   a support comprised of a threaded outer surface;
   a first fishing pole holder attached to and repositionable about said support, wherein said first fishing pole holder is further comprised of a threaded interior surface for mating with said threaded outer surface; and
   a second fishing pole holder attached to and repositionable about said support, wherein a portion of said second fishing pole holder is positioned above said first fishing pole holder and further wherein said second fishing pole holder is generally y-shaped and comprised of a body portion, a holder portion with an opening therein and a set screw for adjusting the size of said opening.

16. The fishing pole holder mount of claim 15 wherein said first fishing pole holder is rotationally and vertically repositionable along said support.

17. The fishing pole holder mount of claim 15 wherein said base is mounted to a watercraft.

18. The fishing pole holder mount of claim 15 further comprising a user specified number of additional fishing pole holders attached to and repositionable about said support.

* * * * *